United States Patent
Pak et al.

(10) Patent No.: US 11,036,743 B2
(45) Date of Patent: Jun. 15, 2021

(54) METHODS, SYSTEMS, AND MEDIA FOR PRESENTING CONTENT ORGANIZED BY CATEGORY

(71) Applicant: Google LLC, Mountain View, CA (US)

(72) Inventors: Alexander Pak, Paris (FR); Felix Raimundo, Paris (FR); Sertan Girgin, Paris (FR); Raphael Marinier, Paris (FR); Vincent Simonet, Paris (FR)

(73) Assignee: Google LLC, Mountain View, CA (US)

( * ) Notice: Subject to any disclaimer, the term of this patent is extended or adjusted under 35 U.S.C. 154(b) by 335 days.

(21) Appl. No.: 15/162,174

(22) Filed: May 23, 2016

(65) Prior Publication Data

US 2017/0337201 A1    Nov. 23, 2017

(51) Int. Cl.
*G06F 16/00*       (2019.01)
*G06F 16/2457*    (2019.01)
(Continued)

(52) U.S. Cl.
CPC ...... *G06F 16/24578* (2019.01); *G06F 16/248* (2019.01); *G06F 16/285* (2019.01); *G06F 16/40* (2019.01); *G06F 16/70* (2019.01)

(58) Field of Classification Search
CPC .......... G06F 17/3053; G06F 17/30017; G06F 17/30554; G06F 17/30598; G06F 17/30781; G06F 16/24578; G06F 16/40; G06F 16/285; G06F 16/248; G06F 16/70; G06F 16/45; G06F 16/48; G06F 16/483; G06F 16/487; G06F 16/489; G06F 16/75
See application file for complete search history.

(56) References Cited

U.S. PATENT DOCUMENTS

| 8,856,099 B1* | 10/2014 | Lasko ............... G06F 17/30864 707/706 |
| 2011/0295612 A1* | 12/2011 | Donneau-Golencer ...................... G06Q 30/02 705/1.1 |

(Continued)

OTHER PUBLICATIONS

International Search Report and Written Opinion dated Mar. 3, 2017 in International Patent Application No. PCT/US2016/065560.

(Continued)

*Primary Examiner* — Tamara T Kyle
*Assistant Examiner* — Lahcen Ennaji
(74) *Attorney, Agent, or Firm* — Byrne Poh LLP

(57) ABSTRACT

Methods, systems, and media for presenting content organized by category are provided. In some embodiments, the method comprises: receiving a request to present a page indicating content related to a first entity; identifying a first group of entities related to the first entity based at least in part on user interaction information; identifying a group of properties corresponding to the first entity; identifying, for each property, a second group of entities corresponding to the property; calculating, for each property, a score for the property; determining a subset of the properties in the group of properties based on the score of each property; identifying, for each property in the subset of properties, a group of content items corresponding to the property; determining a subset of content items from the group of content items; and causing a user interface indicating the subset of content items to be presented.

24 Claims, 5 Drawing Sheets

(51) Int. Cl.
*G06F 16/40* (2019.01)
*G06F 16/70* (2019.01)
*G06F 16/248* (2019.01)
*G06F 16/28* (2019.01)

(56) References Cited

U.S. PATENT DOCUMENTS

| | | | | |
|---|---|---|---|---|
| 2012/0102410 | A1* | 4/2012 | Gewecke | G06F 16/435 |
| | | | | 715/738 |
| 2012/0109966 | A1* | 5/2012 | Liang | G06F 17/30873 |
| | | | | 707/740 |
| 2013/0110830 | A1* | 5/2013 | Vadlamani | G06F 17/30864 |
| | | | | 707/730 |
| 2013/0246412 | A1* | 9/2013 | Shokouhi | G06F 17/30867 |
| | | | | 707/730 |
| 2014/0058724 | A1* | 2/2014 | Barve | G06F 17/30522 |
| | | | | 704/9 |
| 2016/0094889 | A1* | 3/2016 | Venkataraman | |
| | | | | G06F 16/24575 |
| | | | | 725/53 |
| 2017/0187813 | A1* | 6/2017 | Li | H04L 51/32 |

OTHER PUBLICATIONS

Examination Report dated May 7, 2020 in EP Patent Application No. 16822561.3.
Summons to Attend Oral Proceedings dated Feb. 9, 2021 in EP Patent Application No. 16822561.3.

* cited by examiner

METHODS, SYSTEMS, AND MEDIA FOR PRESENTING CONTENT ORGANIZED BY CATEGORY

TECHNICAL FIELD

The disclosed subject matter relates to methods, systems, and media for presenting content organized by category.

BACKGROUND

Users frequently want to find and view media content related to a particular topic. For example, if a person is interested in a particular television show, they may be interested in viewing different episodes of the television show, interviews with actors appearing in the television show, episodes of other television shows that include the same actors, etc. However, it can be difficult to identify, organize, and present the related content to the user.

Accordingly, it is desirable to provide new methods, systems, and media for presenting content organized by category.

SUMMARY

Methods, systems, and media for presenting content organized by category are provided. In accordance with some embodiments of the disclosed subject matter, a method for presenting content organized by category is provided, the method comprising: receiving, from a user device, a request to present a page indicating content related to a first entity; identifying a first group of entities related to the first entity based at least in part on user interaction information; identifying a group of properties corresponding to the first entity; identifying, for each property in the group of properties, a second group of entities corresponding to the property; calculating, for each property in the group of properties, a score for the property based at least in part on the first group of entities identified based on the user interaction information and the second group of entities corresponding to the property, wherein the score indicates a likelihood that a user of the user device will be interested in content corresponding to the property; determining a subset of the properties in the group of properties based on the score of each property; identifying, for each property in the subset of properties, a group of content items corresponding to the property; determining a subset of content items from the group of content items; and causing a user interface indicating the subset of content items to be presented on the user device according to the property corresponding to each content item.

In accordance with some embodiments of the disclosed subject matter, a system for presenting content organized by category is provided, the system comprising: a hardware processor that is programmed to: receive, from a user device, a request to present a page indicating content related to a first entity; identify a first group of entities related to the first entity based at least in part on user interaction information; identify a group of properties corresponding to the first entity; identify, for each property in the group of properties, a second group of entities corresponding to the property; calculate, for each property in the group of properties, a score for the property based at least in part on the first group of entities identified based on the user interaction information and the second group of entities corresponding to the property, wherein the score indicates a likelihood that a user of the user device will be interested in content corresponding to the property; determine a subset of the properties in the group of properties based on the score of each property; identify, for each property in the subset of properties, a group of content items corresponding to the property; determine a subset of content items from the group of content items; and cause a user interface indicating the subset of content items to be presented on the user device according to the property corresponding to each content item.

In accordance with some embodiments of the disclosed subject matter, non-transitory computer-readable media containing computer executable instructions that, when executed by a processor, cause the processor to perform a method for presenting content organized by category are provided. The method comprises: receiving, from a user device, a request to present a page indicating content related to a first entity; identifying a first group of entities related to the first entity based at least in part on user interaction information; identifying a group of properties corresponding to the first entity; identifying, for each property in the group of properties, a second group of entities corresponding to the property; calculating, for each property in the group of properties, a score for the property based at least in part on the first group of entities identified based on the user interaction information and the second group of entities corresponding to the property, wherein the score indicates a likelihood that a user of the user device will be interested in content corresponding to the property; determining a subset of the properties in the group of properties based on the score of each property; identifying, for each property in the subset of properties, a group of content items corresponding to the property; determining a subset of content items from the group of content items; and causing a user interface indicating the subset of content items to be presented on the user device according to the property corresponding to each content item.

In accordance with some embodiments of the disclosed subject matter, a system for presenting content organized by category is provided, the system comprising: means for receiving, from a user device, a request to present a page indicating content related to a first entity; means for identifying a first group of entities related to the first entity based at least in part on user interaction information; means for identifying a group of properties corresponding to the first entity; means for identifying, for each property in the group of properties, a second group of entities corresponding to the property; means for calculating, for each property in the group of properties, a score for the property based at least in part on the first group of entities identified based on the user interaction information and the second group of entities corresponding to the property, wherein the score indicates a likelihood that a user of the user device will be interested in content corresponding to the property; means for determining a subset of the properties in the group of properties based on the score of each property; means for identifying, for each property in the subset of properties, a group of content items corresponding to the property; means for determining a subset of content items from the group of content items; and means for causing a user interface indicating the subset of content items to be presented on the user device according to the property corresponding to each content item.

In some embodiments, the means for calculating the score comprises means for calculating a proportion of entities included in the second group of entities that are also included in the first group of entities.

In some embodiments, the subset of content items is determined based on a popularity of each content item in the group of content items.

In some embodiments, the system further comprises means for selecting, for each property in the subset of properties, a content type based on a popularity of content items associated with the property and the content type, wherein the indications of the subset of content items are presented according to the content type and the property corresponding to each content item.

In some embodiments, at least one content item included in the subset of content items is an aggregation of multiple videos.

In some embodiments, the first entity is a name of a character in a media content item.

In some embodiments, the group of properties includes a property corresponding to other media content the character has appeared in.

In some embodiments, the means for identifying, for each property in the group of properties, the second group of entities corresponding to the property comprises means for accessing a database that indicates an interconnection of each entity in the second group of entities to the first entity via the property.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
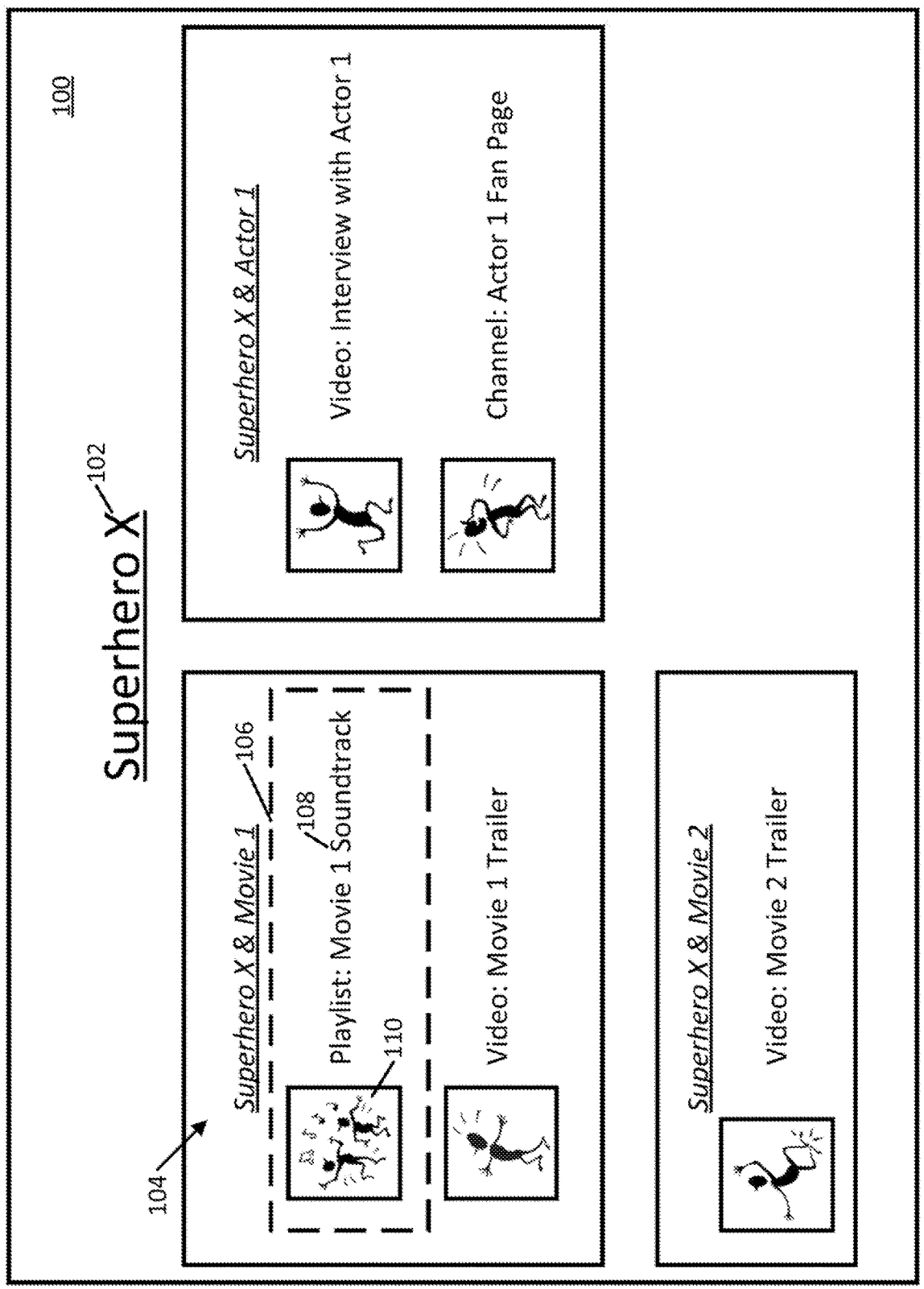
FIG. 1 shows an example of a user interface for presenting content organized by category in accordance with some embodiments of the disclosed subject matter.

In accordance with various embodiments, mechanisms (which can include methods, systems, and media) for presenting content organized by category are provided.

In some embodiments, the mechanisms described herein can identify content related to a particular topic and determine whether the identified content is likely to be interesting to a user using a combination of multiple sources of information. For example, in some embodiments, the sources of information can include information that indicates topics that are related to a first topic, where the relatedness of two topics is inferred based on user behavior (e.g., search queries of a user, content that users typically view in the same viewing session, and/or any other suitable type of user behavior). As another example, in some embodiments, the sources of information can include structured information that indicates properties that relate two topics. As a more particular example, in some embodiments, the structured information can indicate that two movies are related to each other because they both feature a particular actor. The mechanisms can thereby combine information indicating that two content items are related that is inferred based on user actions with structured information indicating a manner in which two content items are related. In some embodiments, the mechanisms can then cause content identified to be relevant to a particular topic to be presented in a user interface that groups the identified content based on a property that relates the identified content to a particular topic.

In some embodiments, the mechanisms described herein can identify a group of properties associated with a first topic or entity and a group of topics or entities associated with each of the properties. In some embodiments, a property can indicate any suitable field or category associated with a particular topic or entity through which the particular topic or entity is related to other topics, entities, or other information, as shown in and described below in connection with FIG. 5. For example, in an instance where the first entity is a fictional character, the group of properties can include movies in which the fictional character has been portrayed, actors who have portrayed the fictional character, and/or any other suitable properties. Continuing with this example, a group of entities corresponding to the property of movies in which the fictional character has been portrayed can include names of each of the movies. The mechanisms can then identify content items related to the entities in the group of entities and can cause indications of these content items to be presented in a user interface organized by property. For example, in instances where the entities in the group of entities include names of movies in which the fictional character was portrayed, the content items can include clips from the movies, soundtracks from the movies, and/or any other suitable content items.

In some embodiments, the mechanisms can identify the properties associated with the first entity using any suitable technique or combination of techniques. For example, in some embodiments, a candidate group of properties can be identified, and a subset of the candidate group of properties can be identified based on how relevant each property is to the first entity and/or how interesting each property is likely to be to a user. As a more particular example, in an instance where the first entity is a fictional character, the candidate group of properties can include: movies in which the character was portrayed, actors who have portrayed the character, and a fictional birthday of the character. Continuing with this example, in some embodiments, the mechanisms described herein can determine that the properties of movies in which the character was portrayed and actors who have portrayed the character are likely to be the most interesting to a user, as described in more detail below in connection with FIG. 4.

Additionally, in some embodiments, the mechanisms can identify the content items corresponding to each property using any suitable information and technique(s). For example, in some embodiments, the mechanisms can identify the content items based on the popularity of multiple content items relevant to each selected property, as described below in connection with FIG. 4.

Note that, in some embodiments, the content items can be any suitable types of content, including video content, audio content, television programs, movies, live-streaming content, audiobooks, documents, web pages, and/or any other suitable types of content. Additionally or alternatively, in some embodiments, the content items can include compilations and/or aggregations of multiple content items. For example, in some embodiments, the content item can be a playlist of content items that are presented in a particular order. As another example, in some embodiments, the content item can be a channel of content associated with a particular topic and/or content creator.

Turning to FIG. 1, an example 100 of a user interface for presenting content organized by category is shown in accordance with some embodiments of the disclosed subject matter. As illustrated, user interface 100 can include a title 102, one or more categories, such as category 104, and content recommendations within the category, such as content recommendation 106.

Title 102 can be any suitable title indicating content of user interface 100. For example, as shown in FIG. 1, title 102 can indicate an entity or a topic, such as a character (fictional or non-fictional), an event, a television program, a book, an interest or hobby, and/or any other suitable topic. In some embodiments, title 102 can include any suitable text, images, graphics, animations, hyperlinks, and/or any other suitable content. Note that the location of title 102 within user interface 100 is shown as an example, and title 102 can be presented at any suitable location. In some embodiments, title 102 can be omitted.

User interface 100 can include any suitable categories related to an entity or topic corresponding to user interface 100. For example, if user interface 100 is related to a particular fictional character (e.g., "Superhero X," as shown in FIG. 1), the categories can include movies in which the fictional character was portrayed (e.g., "Movie 1" corresponding to category 104 of FIG. 1), an actor who has portrayed the fictional character (e.g., "Actor 1" as shown in FIG. 1), and/or any other suitable categories. Note that, in some embodiments, any suitable number of categories (e.g., zero, one, two, five, ten, and/or any other suitable number) can be included.

Each category presented in user interface 100 can include indications of one or more media content items corresponding to the category. For example, as shown in FIG. 1, category 104 corresponds to a particular movie, and corresponding content recommendation 106 can be a playlist of songs and/or music videos included in a soundtrack of the movie. In some embodiments, the content items can include any suitable types of content items, such as videos (e.g., scenes from a movie, interviews with actors from a movie, a trailer, and/or any other suitable videos), a collection of media content related to the category (e.g., a playlist of songs, a playlist of videos related to the category, a channel associated with the category, and/or any other suitable collection of media content), links to web sites associated with the category, images, and/or any other suitable types of content. Note that, in some embodiments, each category can include any suitable number (e.g., zero, one, two, five, ten, and/or any other suitable number) of content items. Additionally, in some embodiments, the content items can be arranged within a category in any suitable manner, such as in a row, in a column, in a carousel, and/or in any other suitable manner.

Categories included in user interface 100 as well as content items presented within each category can be identified using any suitable technique or combination of technique. For example, in some embodiments, categories can be identified based on topics or entities determined to be relevant to a topic of user interface 100, as shown in and described below in connection with FIG. 4. As another example, in some embodiments, content items presented within each category can be identified based on popularity of the content items, as shown in and described below in connection with FIG. 4.

Figure 2:
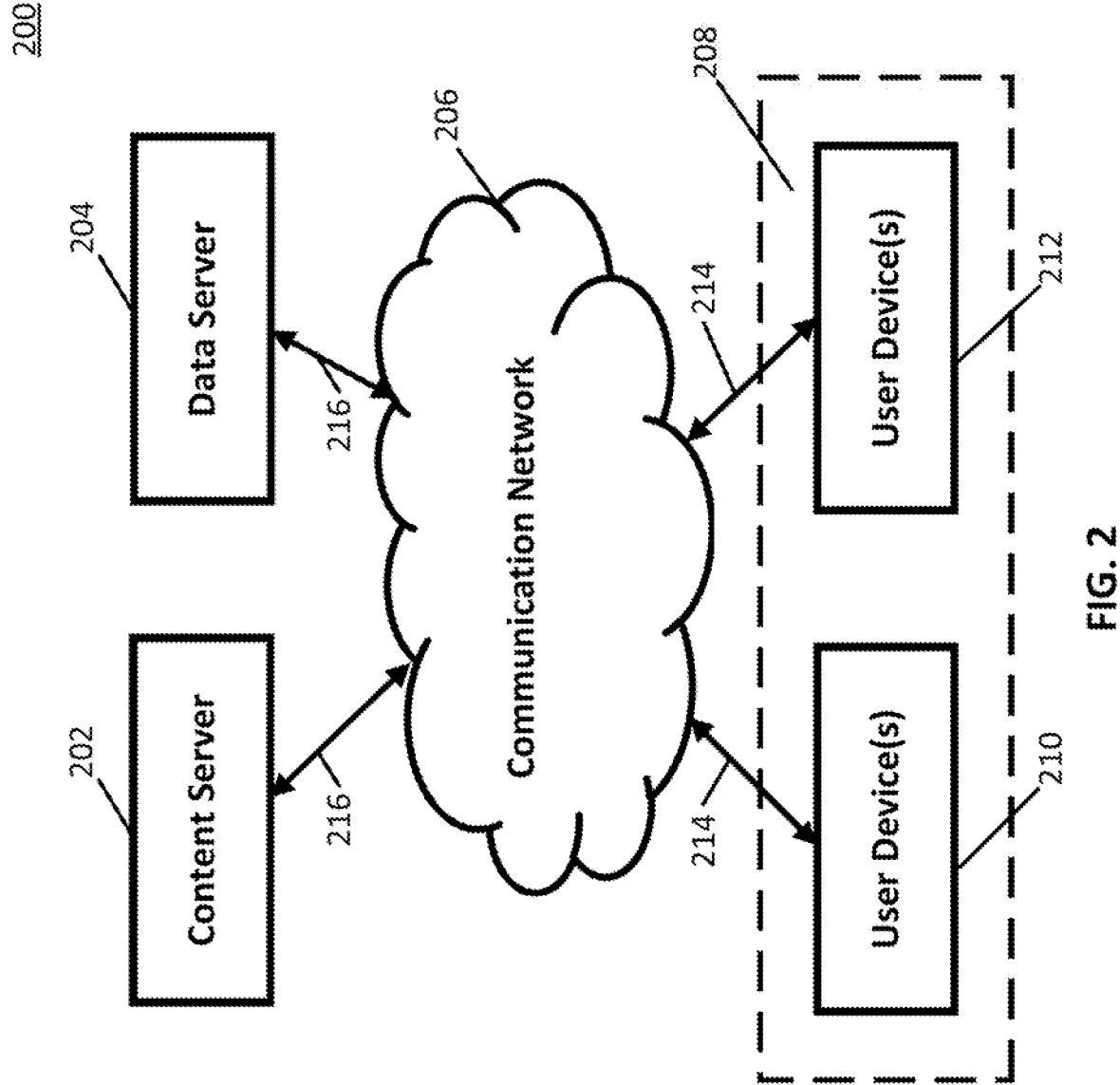
FIG. 2 shows a schematic diagram of an example of a system for presenting content organized by category in accordance with some embodiments of the disclosed subject matter.

Turning to FIG. 2, an example 200 of hardware for presenting content organized by category that can be used in accordance with some embodiments of the disclosed subject matter is shown. As illustrated, hardware 200 can include one or more servers, such as a content server 202, a data server 204, a communication network 206, and one or more user devices 208.

Content server 202 can be any suitable server for storing content items and delivering the content items to a user device 208 in some embodiments. For example, content server 202 can be a server that streams content items to user device 208 via communication network 206. As a more particular example, in some embodiments, content server 202 can stream a content item to user device 208 in response to receiving a request for the content item from user device 208. Content provided by content server 202 can be any suitable content, such as video content, audio content, television programs, movies, cartoons, sound effects, audiobooks, web pages, news articles, streaming live content (e.g., a streaming radio show, a live concert, and/or any other suitable type of streaming live content), electronic books, search results and/or any other suitable type of content. Content can be created and uploaded to content server 202 by any suitable entity. In some embodiments, content server 202 can be omitted.

Data server 204 can be any suitable server for identifying content related to a particular topic or entity. For example, as shown in and described below in connection with FIG. 4, in some embodiments, data server 204 can identify one or more properties relevant to a particular topic or entity and can then identify entities corresponding to the relevant properties. Data server 204 can then identify content items associated with each identified entity, for example, based on the popularity of the content items, as described below in connection with FIG. 4. In some embodiments, data server 204 can be omitted.

Communication network 206 can be any suitable combination of one or more wired and/or wireless networks in some embodiments. For example, communication network 206 can include any one or more of the Internet, a mobile data network, a satellite network, a local area network, a wide area network, a telephone network, a cable television network, a WiFi network, a WiMax network, and/or any other suitable communication network.

User device(s) 208 can include any one or more user devices suitable for presenting media content, presenting content clips, and/or performing any other suitable functions. For example, in some embodiments, user device(s) 208 can include mobile devices, such as a mobile phone, a tablet computer, a laptop computer, a vehicle (e.g., a car, a boat, an airplane, or any other suitable vehicle) entertainment system, a portable media player, or any other suitable mobile device. As another example, in some embodiments, user device(s) 208 can include non-mobile devices such as a desktop computer, a set-top box, a television, a streaming media player, a game console, or any other suitable non-mobile device. User devices 208 can be connected by one or more communications links 214 to communication network 206 that can be linked via communications links 216 to content server 202 and/or data server 204.

Although content server 202 and data server 204 are illustrated as separate devices, any one or more of these devices can be combined into one device in some embodiments. Also, although only one each of content server 202 and data server 204 are shown in FIG. 2 to avoid overcomplicating the figure, any suitable one or more of each device can be used in some embodiments.

Although only one user device 208 is shown in FIG. 2 to avoid over-complicating the figure, any suitable number of each of these devices, and any suitable types of these devices, can be used in some embodiments.

Figure 3:
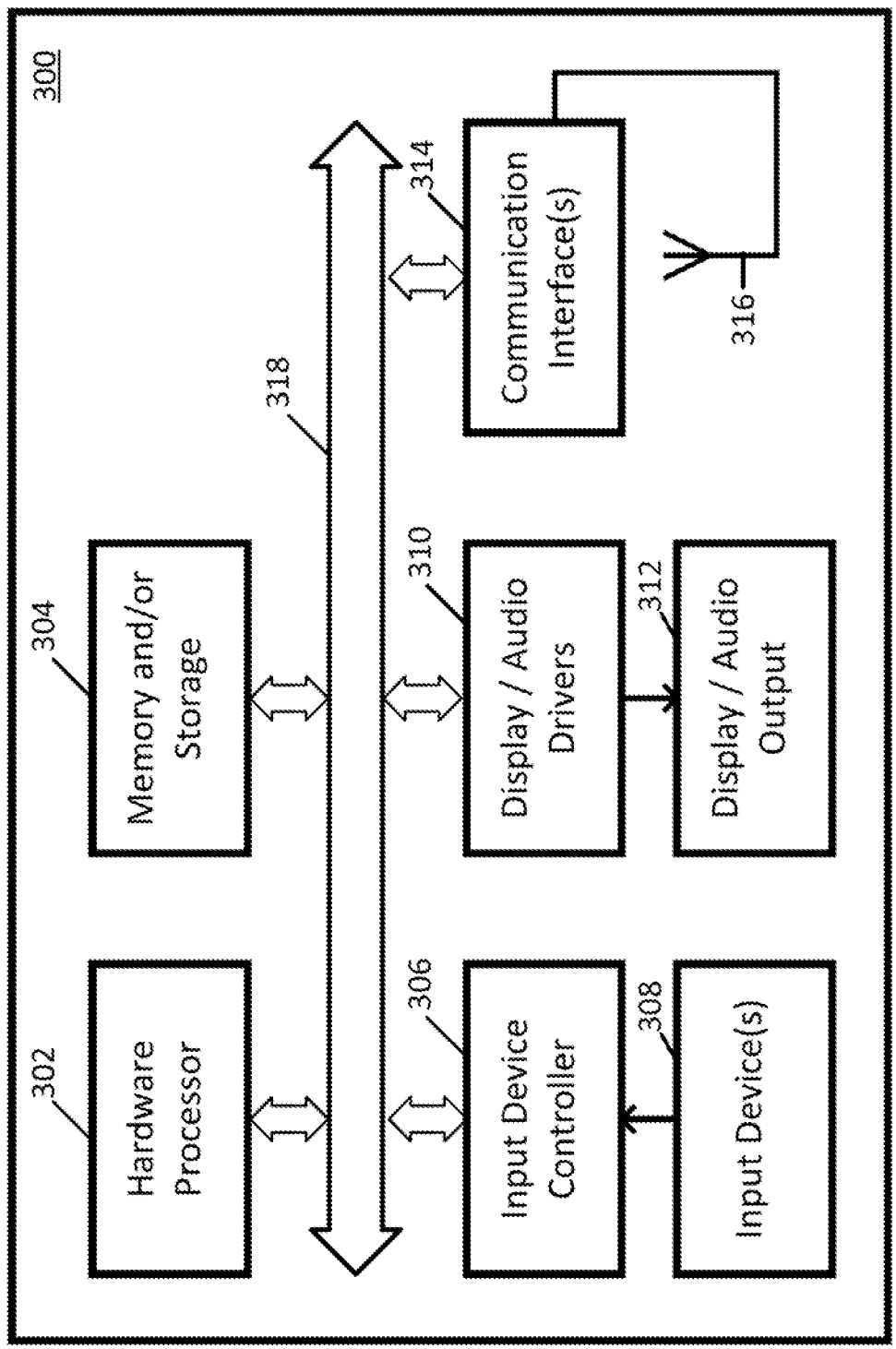
FIG. 3 shows an example of hardware that can be used in a server and/or a user device in accordance with some embodiments of the disclosed subject matter.

Content server 202, data server 204, and user device 208 can be implemented using any suitable hardware in some embodiments. For example, in some embodiments, devices 202, 204, and 208 can be implemented using any suitable general purpose computer or special purpose computer. For example, a server may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments.

Memory and/or storage 304 can be any suitable memory and/or storage for storing programs, data, media content, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output circuitries 312 in some embodiments. For example, display/audio drivers 310 can be circuitry for driving an LCD display, a speaker, an LED, or any other type of output device.

Communication interface(s) 314 can be any suitable circuitry for interfacing with one or more communication networks, such as network 206 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network in some embodiments. In some embodiments, antenna 316 can be omitted when not needed.

Bus 318 can be any suitable mechanism for communicating between two or more components 302, 304, 306, 310, and 314 in some embodiments.

Any other suitable components can be included in hardware 300 in accordance with some embodiments.

Figure 4:
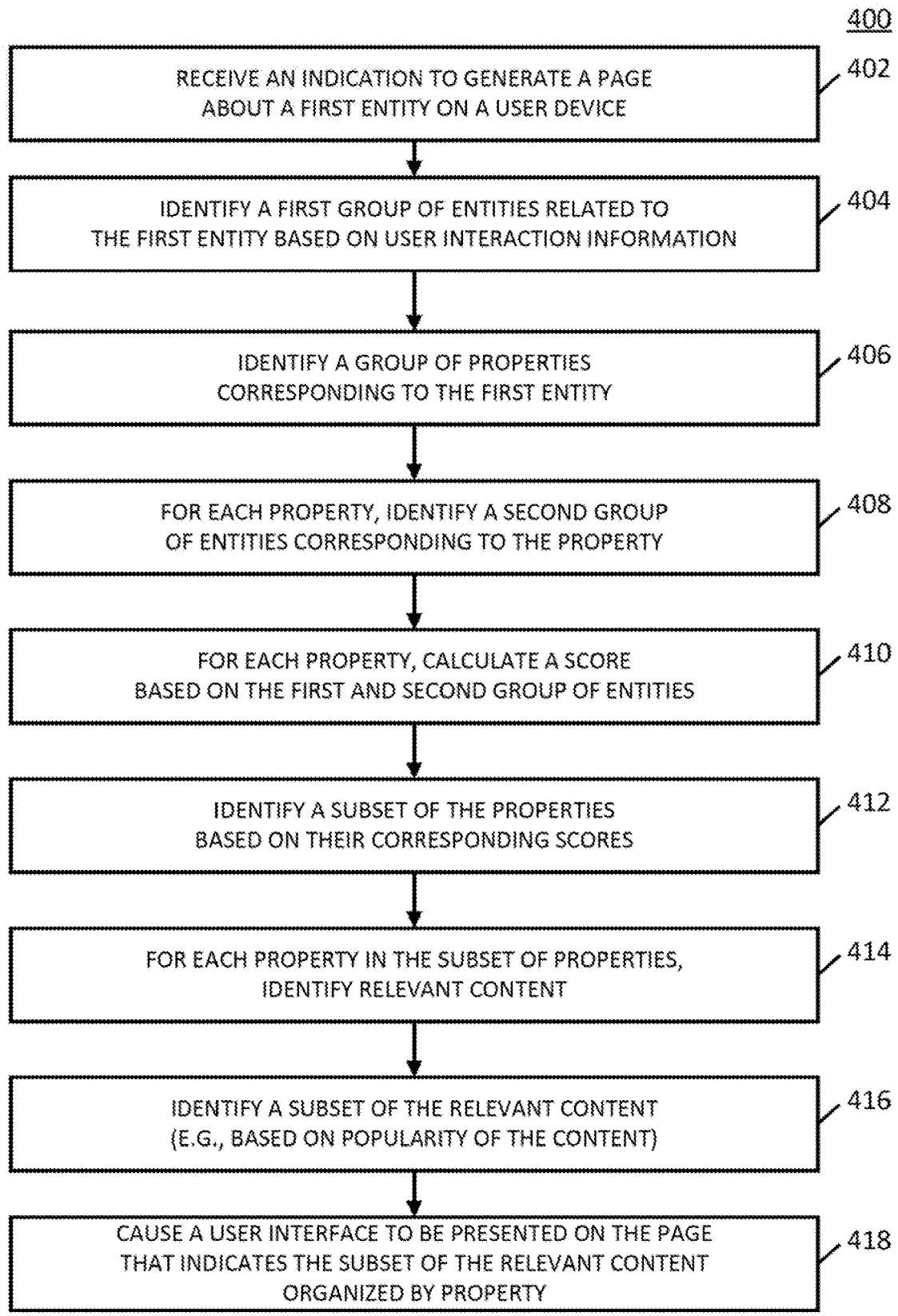
FIG. 4 shows an example of a process for identifying categories and content within the categories in accordance with some embodiments of the disclosed subject matter.

Turning to FIG. 4, an example 400 of a process for identifying categories related to a topic and presenting content organized by category is shown in accordance with some embodiments of the disclosed subject matter.

Process 400 can begin by receiving an indication to generate a page about a first topic and/or entity on a user device at 402. The indication can be received in response to any suitable action. For example, in some embodiments, the indication can be received in response to detecting that a query about the first entity has been entered on the user device (e.g., in a search box, and/or in any other suitable manner). As another example, in some embodiments, the indication can be received in response to detecting that the user device has navigated to a particular page (e.g., a page related to the first topic and/or entity, a home page of a content sharing service, and/or any other suitable page).

Process 400 can identify a first group of entities related to the first entity at 404. In some embodiments, the entities included in the first group of entities can be any suitable type of entity, such as names (e.g., names of media content, names of actors, names of locations, names of events, and/or any other suitable names), topics (e.g., interests, hobbies, and/or any other suitable type of topics), and/or any other suitable types of entities. For example, in instances where the first entity is a name of a fictional character, the first group of entities can include names of books the character has appeared in, names of movies and/or television programs in which the fictional character has been portrayed, a name of a creator of the fictional character, names of actors who have portrayed the character in television programs and/or movies, names of other characters associated with the fictional character, and/or any other suitable entities.

Note that, in some embodiments, the first group of entities can be identified using any suitable technique or combination of techniques. For example, in some embodiments, entities related to the first topic or entity can be identified based on user actions related to the first topic or entity. As a more particular example, in some embodiments, process 400 can identify search terms that are frequently included in search queries that include the first topic or entity. As another more particular example, in some embodiments, process 400 can identify particular content items (e.g., particular web pages, particular documents, particular videos, particular movies, and/or any other suitable types of content) that are frequently viewed in connection with content related to the first topic or entity. As a specific example, in an instance where the first topic or entity corresponds to a fictional character, process 400 can identify content items that are frequently returned in response to a search query related to the fictional character. As another specific example, in an instance where the first topic or entity is related to a particular content item, process 400 can identify content items that users frequently view after viewing the particular content item.

In instances where information relating to user actions is used to identify related entities (e.g., based on content returned in response to a user's search query, based on search terms frequently included together in a user's search queries, and/or any other suitable user actions), consent to use the information related to user actions can be requested from the user. For example, in some embodiments, consent can be requested from the user via a user interface that allows the user to set various privacy settings. In some embodiments, the privacy settings can be modified and/or updated at any suitable time.

As another example, in some embodiments, entities related to the first entity can be identified based on keywords and/or metadata that indicate a topic and/or genre corresponding to the entities. As a more particular example, in instances where the first entity is a name of a fictional character, the keywords and/or metadata can indicate a genre of the content (e.g., book, television program, movie, and/or any other suitable content) in which the character appears (e.g., mystery, action, thriller, and/or any other suitable genre), a name of content in which the character appears, a creator of the content in which the character appears, and/or any other suitable information. The keywords and/or metadata can then be used to identify other entities associated with similar keywords and/or metadata (e.g., characters associated with the same genre of content, content that also includes the same character, content created by the same content creator, and/or any other suitable similar entities).

Note that, in some embodiments, the first group of entities can be identified as related to the first topic or entity based on inferences from user actions in connection with the first topic or entity. In some such embodiments, the first group of entities can be identified based on the actions of any suitable number (e.g., one, ten, one hundred, one thousand, and/or any other suitable number) of users. Additionally, in some embodiments, the first group of entities can be identified for a particular topic or entity at any suitable time, and can be stored (e.g., in memory 304 of data server 204) for use at a later time. In some such embodiments, the group of first entities can be updated at any suitable time and/or at any suitable time intervals.

In some embodiments, entities within the first group of entities can be ranked and/or sorted in any suitable manner. For example, in some embodiments, the entities can be ranked based on a metric of how related each entity is to the first entity. As a more particular example, in some embodiments, relatedness of two entities can be determined based on any suitable information, such as a frequency with which the two entities appear together in search queries, a frequency with which the two entities appear together in a corpus of documents or other content, a similarity in keywords associated with each of the two entities, and/or any other suitable metric. In some embodiments, the first group of entities can be trimmed to include a predetermined number of entities based on the ranking (e.g., the top N entities). As another example, in some embodiments, the entities can be sorted based on how they relate to the first entity. As a more particular example, in instances where the first entity is a name of a fictional character, the first group of entities can be sorted into a subset of entities that are names of movies in which the fictional character appears, a subset of entities that are names of actors who have portrayed the fictional character, and/or any other suitable subsets of entities.

Process 400 can identify the entities related to the first entity using any suitable technique or combination of techniques. For example, in some embodiments, the entities related to the first entity can be identified based on a search query to a database (e.g., a relational database, a knowledgebase, and/or any other suitable type of database) and/or any suitable network of interconnected information or ontology. As a more particular example, in some embodiments, process 400 can transmit a query to a database that includes an identifier of the first entity. In some embodiments, the database can then transmit a response that includes one or more identifiers of entities that are related to the first entity. Additionally, in some embodiments, the response can include any suitable information indicating manners in which the entities are related to the first entity. For example, in some embodiments, the information can indicate a type of relationship with the first entity (e.g., included in search results with the first entity, included in search terms with the first entity, and/or any other suitable relationship), a strength of the relationship between the two entities, a number of connections between the two entities, and/or any other suitable information.

Figure 5:
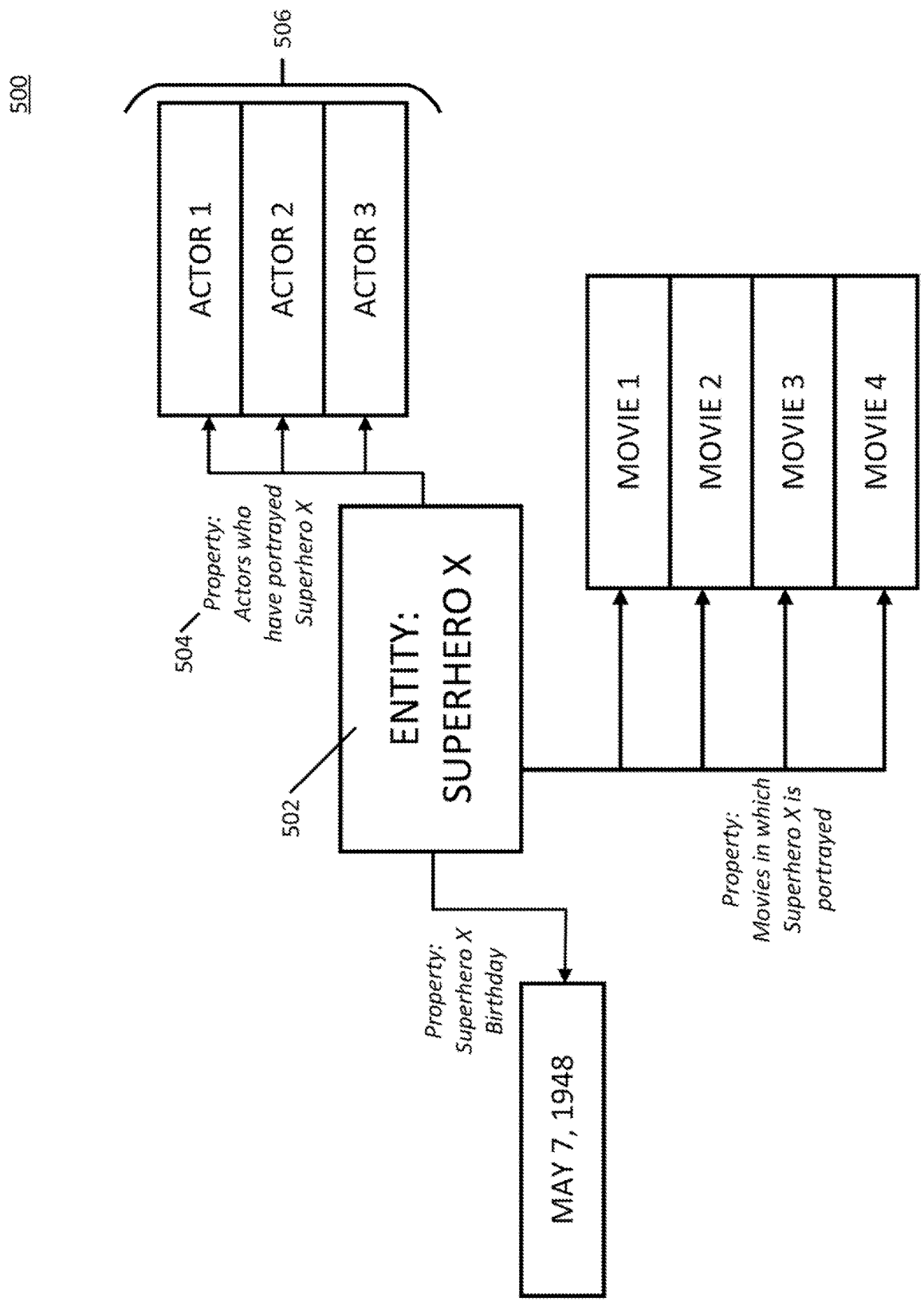
FIG. 5 shows an example of a schematic diagram for identifying categories in accordance with some embodiments of the disclosed subject matter.

Process 400 can identify a group of properties corresponding to the first entity at 406. In some embodiments, a property can indicate any suitable field or category associated with the first entity through which the first entity is related to other topics, entities, or other information. FIG. 5 shows an example 500 of a schematic for identifying properties and corresponding entities in accordance with some embodiments of the disclosed subject matter. As illustrated in FIG. 5, in instances where a first entity 502 is a fictional character (e.g., "Superhero X"), the group of properties can include "Actors who have portrayed Superhero X," "Movies that include Superhero X," "Superhero X birthday," and/or any other suitable properties. Note that, although three properties are shown in FIG. 5, in some embodiments, any suitable number (e.g., zero, one, five, ten, and/or any other suitable number) of properties can be included. Note that, in some embodiments, the first entity can indicate a topic, such as "Italian food." In some such embodiments, the properties can include other fields or categories related to the topic. In the specific example of "Italian food," the properties can include chefs that are known for Italian food, particular Italian dishes, countries associated with Italian food, and/or any other suitable properties.

In some embodiments, process 400 can identify the properties using any suitable information and technique(s). For example, in some embodiments, entities of a particular type (e.g., fictional character, name of a television program, name of a person, and/or any other suitable entity) can be associated with a predetermined group of properties which can be retrieved by process 400. As another example, in some embodiments, process 400 can identify the properties using data structured in a format that indicates a group of properties associated with a particular topic or entity. As a more particular example, in an instance where the first topic or entity is "Italian food," the structured data can include "dining/cuisine/chefs" (indicating that "chefs" is a property of "Italian food"), "dining/cuisine/dishes" (indicating that "dishes" is a property of "Italian food"), "dining/cuisine/region of origin" (indicating that "region of origin" is a property of "Italian food"), and/or any other suitable data.

At 408, process 400 can identify a second group of entities corresponding to each property in the group of properties identified at block 408. For example, as shown in FIG. 5, a property 504 ("Actors who have portrayed Superhero X") can be associated with a second group of entities 506, which includes three entities ("Actor 1," "Actor 2," and "Actor 3"). As shown in FIG. 5, each property associated with first entity 502 can be associated with any suitable number of entities (e.g., zero, one, two, five, ten, and/or any other suitable number of entities).

Process 400 can identify the entities corresponding to each property using any suitable information and technique(s). For example, in some embodiments, process 400 can query a database using both the first entity (e.g., "Superhero X") and a property (e.g., "actors who have portrayed the first entity") and can receive a group of entities corresponding to the first entity and the property in response to the query. In some embodiments, the group of entities can be identified based on manual entries, referencing external databases (e.g., a database identifying actors in particular movies and/or television programs, and/or any other suitable external databases), and/or any other suitable sources. Additionally, in some embodiments, the entities corresponding to each property can be indicated in structured data corresponding to each property. Continuing the example above of an instance where the first topic or entity is "Italian food" and a property is "dining/cuisine/dishes," the structured data can indicate that entities corresponding to "dining/cuisine/dishes" include "lasagna," "pizza," "gelato," and/or any other suitable items.

At 410, process 400 can calculate a score for each property based on the first group of entities identified at block 404 and the second group of entities identified at block 408. For example, in some embodiments, the score can be calculated as, for each property, the proportion of entities associated with the property (e.g., group of entities 506 corresponding to property 504) that are included in the first group of entities relevant to the first entity identified at 404. As a more particular example, in an instance where there are three entities in the second group of entities corresponding to property 504 (e.g., in group of entities 506 as shown in FIG. 5) and two of the three entities were included in the first group of entities identified at block 404, the score for property 504 can be 0.67. Note that, in some embodiments, a property can receive a score of 0. For example, in instances where no entities in the second group of entities corresponding to the property are included in the first group of entities identified as relevant to the first entity, the property can receive a score of 0. As a more particular example as shown in FIG. 5, the property "Superhero X birthday" can receive a score of 0 if the entity "May 7, 1948" is not included in the first group of entities identified at block 404 as particularly relevant or interesting to the entity "Superhero X." In some embodiments, a lower score (e.g., closer to 0, and/or lower in any other suitable scale) can indicate that content associated with a particular property is less likely to be of interest to a user, and a higher score (e.g., closer to 1, and/or higher in any other suitable scale) can indicate that content associated with a particular property Is more likely to be of interest to a user.

Note that, in some embodiments, a score for a particular property can additionally be based on information associated with one or more content items corresponding to the property. For example, in some embodiments, the score can be based on popularity of the one or more media content items. As a more particular example, in some embodiments, properties associated with content items determined to be more popular (e.g., based on a number of views of the content items, based on a number of times the content items have been endorsed and/or shared, based on a number of subscribers to a channel of content items, and/or based on any other suitable information) can be scored more highly than properties associated with content items determined to be less popular. As another example, in some embodiments, the score for the property can be based on an average proportion of content items associated with the property that is viewed by users before navigating away from the content items. As a more particular example, properties associated with content items that tend to be watched fully or nearly to completion can be scored more highly than properties associated with content items that tend to be quickly closed and/or navigated away from (e.g., based on viewing statistics aggregated over multiple users). In some embodiments, the information associated with content items corresponding to a particular property can be combined in any suitable manner.

Process 400 can identify a subset of the properties based on their corresponding scores at 412. For example, in some embodiments, the subset can include properties with scores that exceed a predetermined threshold (e.g., greater than 0.5, greater than 0.7, and/or any other suitable score). As another example, in some embodiments, the subset of properties can include the top N properties based on score. Process 400 can identify any suitable number (e.g., zero, one, two, five, and/or any other suitable number) of properties in the subset of properties.

Note that, in some embodiments, process 400 can use any other information to identify the subset of properties. For example, in some embodiments, process 400 can identify the subset of properties based on a total number of content items (e.g., over the second group of entities identified at block 408) associated with the property. As a more particular example, in some embodiments, process 400 can include properties in the subset of properties that have more than a predetermined number of content items associated with the property. Additionally or alternatively, in some embodiments, process 400 can determine that particular properties are not to be included in the subset of properties based on content associated with the property. For example, in some embodiments, process 400 can determine that a property is associated with content that includes objectionable content (e.g., violence, particular types of language, and/or any other suitable types of objectionable content) and/or is generally associated with content of a particular content rating (e.g., "R," "PG-13," and/or any other suitable type of content rating. Furthermore, in some embodiments, process 400 can determine that none of the properties included in the subset of properties overlap substantially in associated content, and if it is determined that multiple properties overlap in content (e.g., include the same content items, and/or overlap in any other suitable manner), process 400 can deduplicate the subset of properties.

Process 400 can identify relevant content items for each property in the subset of the properties at 414. For example, as shown in FIG. 5, in an instance where the subset of properties includes "Actors who have portrayed Superhero X," process 400 can identify content items that include the actors listed as entities corresponding to this property (e.g., the entities in group of entities 506 as shown in FIG. 5). In some embodiments, the content items can include any suitable type of content, such as video content, audio content, television programs, movies, music videos, documents, audiobooks, streaming live content, web pages, and/or any other suitable type of content. Additionally, in some embodiments, the content can include a compilation and/or an aggregation of content items. For example, in some embodiments, the content can include a playlist of content items, where presentation of a second content item begins automatically after presentation of a first content item finishes. As another example, in some embodiments, the content can include a channel that includes multiple content items corresponding to a particular topic, theme, content created by a particular creator, and/or any other suitable category. As a more particular example, in instances where the property corresponds to a particular actor, the content can include a channel corresponding to a fan page for the actor, which can include multiple content items each associated with the actor (e.g., videos featuring the actor, interviews with the actor, and/or any other suitable content items). Note that, in instances where the content includes a playlist and/or a channel, the playlist and/or the channel can be include content that is aggregated by any suitable person and/or group.

Process 400 can identify a subset of the relevant content at 416 based on any suitable information. For example, in some embodiments, the subset of the relevant content can be identified based on popularity of the content. As a more particular example, in some embodiments, process 400 can calculate a popularity score for each item of content identified at block 414 and can include the top N content items in the subset of relevant content. In some embodiments, popularity of a content item can be determined in any suitable manner. For example, in some embodiments, popularity can be based on a number of times the content item has been viewed, a number of times the content item has been viewed within a predetermined time period (e.g., the last day, the last week, and/or any other suitable time period), an average percentage of the content item that has been viewed by users (e.g., 50% of the content item, 90% of the content item, and/or any other suitable percentage), the number of times the content item has been commented on, the number of times the content item has been shared in social networking posts, and/or any other suitable information. As another example, in instances where the content item includes a channel of content, popularity of the channel can be determined based on a number of subscribers to the channel.

Process 400 can cause a user interface that includes the subset of relevant content organized by the identified subset of properties to be presented on a user device at 418. For example, in some embodiments, indications of the relevant content can be visually grouped based on the corresponding properties, as shown in and described above in connection with FIG. 1. As a more particular example, in some embodiments, the indications of the relevant content can be grouped into one or more shelves of content that, in some embodiments, can correspond to the identified subset of properties. In some such embodiments, process 400 can identify one or more types of shelves to be presented in the user interface based on information associated with the properties and/or information associated with content corresponding to the properties. For example, in some embodiments, a particular shelf can include a particular type of content (e.g., videos, playlists of content items, a channel of content items, and/or any other suitable types of content), and process 400 can determine the type of content to be presented in the shelf based on information associated with a selected property (e.g., which types of content associated with the property are most popular, which types of content associated with the property are most related to the first entity, and/or any other suitable information). In some embodiments, a shelf type can be determined based on the property scores calculated in block 410. Additionally, note that, in some embodiments, multiple types of content for a particular property and/or category can be included. For example, in some embodiments, a first shelf can indicate videos associated with a particular actor who has portrayed a particular fictional character (e.g., videos associated with "Actor 1 who has portrayed Superhero X") and a second shelf can indicate playlists associated with the particular actor who has portrayed the particular fictional character (e.g., playlists associated with "Actor 1 who has portrayed Superhero X").

In some embodiments, the indications of relevant content can include any suitable information, such as a name of the content item, a creator of the content item, a thumbnail image associated with the content item, and/or any other suitable information. Additionally or alternatively, in some embodiments, the indications of the relevant content can include a hyperlink that, when selected, causes the relevant content to begin being presented on the user device.

In some embodiments, process 400 can determine a title for the user interface using any suitable information and technique(s). For example, in some embodiments, process 400 can determine the title based on the first entity. As a more particular example, in some embodiments, process 400 can determine that the title of the user interface is to be the first entity and/or text related to the first entity. As a specific example, if the first entity is the name of a particular fictional character such as "Superhero X," process 400 can determine that the title for the user interface is to be "Superhero X," as shown in FIG. 1. As another example, in some embodiments, the title can be determined based on information related to the first entity and to the subset of properties identified at block 412. For example, in instances where all of the properties in the subset of properties are related to a particular topic (e.g., actors who have portrayed a particular fictional character), the title of the user interface can reflect the topic common to the properties.

Similarly, in some embodiments, process 400 can determine titles for each category of content presented in the user interface using any suitable information or technique(s). For example, in some embodiments, the title for each category of content (or shelf of content, as described above), can be determined based on a property associated with the category, as shown in FIG. 1. Additionally or alternatively, in some embodiments, the title for each category of content can be determined based on a type of content included in the category of content. For example, in some embodiments, the title can indicate that the category of content includes videos related to a particular property, playlists related to a particular property, channels of content related to a particular property, and/or any other suitable information.

It should be understood that at least some of the above described blocks of the process of FIG. 4 can be executed or performed in any order or sequence not limited to the order and sequence shown in and described in the figure. Also, some of the above blocks of the process of FIG. 4 can be executed or performed substantially simultaneously where appropriate or in parallel to reduce latency and processing times. Additionally or alternatively, some of the above described blocks of the process of FIG. 4 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described here collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for presenting content organized by category are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting content organized by category, comprising:
receiving, from a user device, a request to present a page indicating content related to a first entity;
identifying, using a hardware processor, a first group of entities related to the first entity based at least in part on user interaction information related to the first entity by a plurality of users associated with a plurality of user devices other than the user device;
identifying, using the hardware processor, a group of properties corresponding to the first entity;
identifying, using the hardware processor, for each property in the group of properties, a second group of entities corresponding to the property;
calculating, using the hardware processor, for each property in the group of properties, a score for the property based at least in part on the first group of entities identified based on the user interaction information and the second group of entities corresponding to the property, wherein the score indicates a likelihood that a user of the user device will be interested in content corresponding to the property;
determining, using the hardware processor, a subset of the properties in the group of properties based on the score of each property;
identifying, using the hardware processor, for each property in the subset of properties, a group of content items corresponding to the property;
determining, using the hardware processor, a subset of content items from the group of content items; and
causing, using the hardware processor, a user interface indicating the subset of content items to be presented on the user device according to the property corresponding to each content item.

2. The method of claim 1, wherein calculating the score comprises calculating a proportion of entities included in the second group of entities that are also included in the first group of entities.

3. The method of claim 1, wherein the subset of content items is determined based on a popularity of each content item in the group of content items.

4. The method of claim 1, further comprising selecting, for each property in the subset of properties, a content type based on a popularity of content items associated with the property and the content type, wherein indications of the subset of content items are presented according to the content type and the property corresponding to each content item.

5. The method of claim 1, wherein at least one content item included in the subset of content items is an aggregation of multiple videos.

6. The method of claim 1, wherein the first entity is a name of a character in a media content item.

7. The method of claim 6, wherein the group of properties includes a property corresponding to other media content the character has appeared in.

8. The method of claim 1, wherein identifying, for each property in the group of properties, the second group of entities corresponding to the property comprises accessing a database that indicates an interconnection of each entity in the second group of entities to the first entity via the property.

9. A system for presenting content organized by category, the system comprising:
a hardware processor that is programmed to:
receive, from a user device, a request to present a page indicating content related to a first entity;
identify a first group of entities related to the first entity based at least in part on user interaction information related to the first entity by a plurality of users associated with a plurality of user devices other than the user device;
identify a group of properties corresponding to the first entity;
identify, for each property in the group of properties, a second group of entities corresponding to the property;
calculate, for each property in the group of properties, a score for the property based at least in part on the first group of entities identified based on the user interaction information and the second group of entities corresponding to the property, wherein the score indicates a likelihood that a user of the user device will be interested in content corresponding to the property;
determine a subset of the properties in the group of properties based on the score of each property;
identify, for each property in the subset of properties, a group of content items corresponding to the property;
determine a subset of content items from the group of content items; and
cause a user interface indicating the subset of content items to be presented on the user device according to the property corresponding to each content item.

10. The system of claim 9, wherein the hardware processor is further programmed to calculate a proportion of entities included in the second group of entities that are also included in the first group of entities.

11. The system of claim 9, wherein the subset of content items is determined based on a popularity of each content item in the group of content items.

12. The system of claim 9, wherein the hardware processor is further programmed to select, for each property in the subset of properties, a content type based on a popularity of content items associated with the property and the content type, wherein indications of the subset of content items are presented according to the content type and the property corresponding to each content item.

13. The system of claim 9, wherein at least one content item included in the subset of content items is an aggregation of multiple videos.

14. The system of claim 9, wherein the first entity is a name of a character in a media content item.

15. The system of claim 14, wherein the group of properties includes a property corresponding to other media content the character has appeared in.

16. The system of claim 9, wherein the hardware processor is further programmed to access a database that indicates an interconnection of each entity in the second group of entities to the first entity via the property.

17. A non-transitory computer-readable medium containing computer executable instructions that, when executed by a processor, cause the processor to perform a method for presenting content organized by category, the method comprising:
- receiving, from a user device, a request to present a page indicating content related to a first entity;
- identifying a first group of entities related to the first entity based at least in part on user interaction information related to the first entity by a plurality of users associated with a plurality of user devices other than the user device;
- identifying a group of properties corresponding to the first entity;
- identifying, for each property in the group of properties, a second group of entities corresponding to the property;
- calculating, for each property in the group of properties, a score for the property based at least in part on the first group of entities identified based on the user interaction information and the second group of entities corresponding to the property, wherein the score indicates a likelihood that a user of the user device will be interested in content corresponding to the property;
- determining a subset of the properties in the group of properties based on the score of each property;
- identifying, for each property in the subset of properties, a group of content items corresponding to the property;
- determining a subset of content items from the group of content items; and
- causing a user interface indicating the subset of content items to be presented on the user device according to the property corresponding to each content item.

18. The non-transitory computer-readable medium of claim 17, wherein calculating the score comprises calculating a proportion of entities included in the second group of entities that are also included in the first group of entities.

19. The non-transitory computer-readable medium of claim 17, wherein the subset of content items is determined based on a popularity of each content item in the group of content items.

20. The non-transitory computer-readable medium of claim 17, wherein the method further comprises selecting, for each property in the subset of properties, a content type based on a popularity of content items associated with the property and the content type, wherein indications of the subset of content items are presented according to the content type and the property corresponding to each content item.

21. The non-transitory computer-readable medium of claim 17, wherein at least one content item included in the subset of content items is an aggregation of multiple videos.

22. The non-transitory computer-readable medium of claim 17, wherein the first entity is a name of a character in a media content item.

23. The non-transitory computer-readable medium of claim 22, wherein the group of properties includes a property corresponding to other media content the character has appeared in.

24. The non-transitory computer-readable medium of claim 17, wherein identifying, for each property in the group of properties, the second group of entities corresponding to the property comprises accessing a database that indicates an interconnection of each entity in the second group of entities to the first entity via the property.

* * * * *